3,060,299
AUTOMATIC TEMPERATURE CONTROL SYSTEM
Walter A. Morgan, Baytown, Tex., assignor, by mesne assignments, to Esso Research and Engineering Company, Elizabeth, N.J., a corporation of Delaware
Filed Nov. 25, 1960, Ser. No. 71,465
4 Claims. (Cl. 219—20)

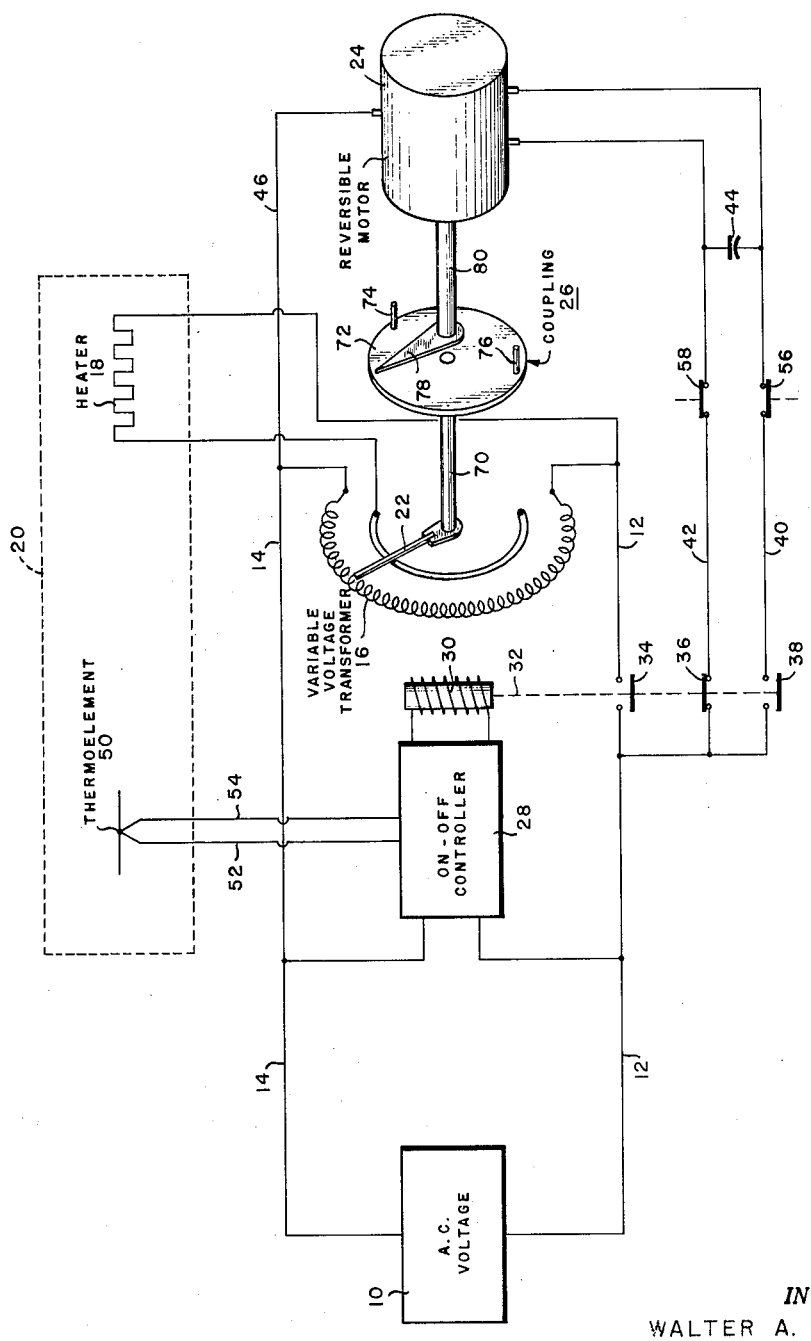

This invention relates to automatic temperature controlling systems. More particularly, this invention is an automatic power level adjuster for use with on-off temperature controllers.

In conventional on-off temperature controlling systems, a heater and a temperature sensing element are usually included within the enclosure the temperature of which is to be controlled. If the temperature within the enclosure drops below the desired temperature (i.e., the set point), the on-off temperature controller senses this condition and supplies heat to the heater to return the temperature to the set point. At the set point temperature, the on-off temperature controller stops the supply of heat to the heater.

It has been found through experience that for the best temperature control, that is, minimum temperature variation within the enclosure, the heater should be on and off for equal periods of time. In the conventional systems, this is accomplished by manually observing the on-off cycles and manually adjusting the setting of the variable voltage source until the on-off intervals are the same duration. This is a time-consuming operation and must be repeated whenever process conditions or environmental conditions change. Hence, an automatic method of adjusting the variable voltage source for equal on-off intervals has considerable utility.

The invention to be described herein provides the art with an automatic temperature controlling system which automatically adjusts itself to provide equal on and off time periods, thereby providing the best possible temperature control within an enclosure.

The invention as well as its many advantages will be understood by reference to the following detailed description and drawings in which the single FIGURE is a schematic representation of one embodiment of the invention.

Referring to the figure, a voltage source such as the alternating current voltage source 10 supplies current through lines 12 and 14 to a voltage divider such as the auto-transformer 16 connected across lines 12 and 14.

A heater 18 is located within the enclosure 20. Enclosure 20 is the enclosure the temperature of which it is desired to control. The heater 18 receives voltage from the transformer 16 by means of a movable tap 22. The other terminal of the heater 18 is connected to the line 12.

Movement of the tap 22 is controlled by means of a two-phase reversible motor 24 which has its shaft coupled to the tap 22 by means of a specially constructed coupling 26.

A shaft 70 is connected to the voltage tap 22. The rotation of shaft 70 controls the position of the tap 22 in the variable voltage transformer 16. For example, with clockwise shaft rotation, the output voltage increases; with counterclockwise shaft rotation, the output voltage from the variable voltage transformer decreases.

A disk 72 is attached to the outer end of the shaft 70. A pair of arcuately spaced-apart pins 74 and 76 extends from the disk 72. The spacing between pins 74 and 76 may, of course, be changed if desired.

An actuating arm 78 is connected to the outer end of the motor shaft 80. Actuating arm 78 extends outwardly from the shaft 80 and is adapted to move or rotate between pins 74 and 76 when the reversible motor 24 is actuated. Shaft 80 is disconnected from shaft 70 so that unless the actuating arm 78 is moved through an arc sufficiently great to contact one of the pins 74 or 76, rotation of shaft 80 does not cause rotation of shaft 70.

An "On-Off controller" 28 is also connected across the lines 12 and 14. A relay coil 30 is actuated by the On-Off controller 28 and controls the position of relay 32 including contacts 34, 36, and 38.

The reversible motor 24 is also connected across the lines 12 and 14. The motor 24 is caused to rotate the shaft 80 in one direction, say clockwise, when current is allowed to flow through conducting line 40; the shaft is rotated counterclockwise when current is allowed to flow through conducting line 42. Capacitor 44 connected across lines 40 and 42 is a phase shift capacitor. The circuit through the motor 24 is completed by means of conducting line 46 connected to the main conducting line 14.

A thermoelement 50 is also located within enclosure 20. Thermoelement 50 is a temperature sensing element such as a thermocouple for sensing the temperature within the enclosure 20. The thermoelement 50 controls the operation of the On-Off controller 28 through lines 52 and 54.

In operation, assume that the temperature within enclosure 20 has fallen below the predetermined desired temperature, the set point. When this occurs, the On-Off controller 28 actuates the relay coil 30 to move the relay 32 upwardly. The upward movement of relay 32 closes contact 34, opens contact 36, and closes contact 38. Thus, voltage is supplied to the heater 18 to increase the temperature within the enclosure 20. Also, the circuit through line 40 is completed to the reversible motor 24 to rotate the shaft 80 of the reversible motor in a clockwise direction. When the temperature within enclosure 20 reaches the predetermined temperature, the On-Off controller 28 deenergizes coil 30, returning the relay 32 to the position shown in the figure. Thus, voltage to the heater 18 is cut off and the heating discontinues. Also, the current through line 40 is discontinued thus stopping the clockwise rotation of shaft 78 and the switch 36 completes the circuit through line 42 to the reversible motor 24 to cause counterclockwise rotation of the shaft 80.

Notice that as long as the heater is on and off for equal periods of time, the actuating shaft 78 will rotate in one direction and then in the other direction between the pins 74 and 76 without contacting either of the pins. Thus, the tap 22 is only moved to change the voltage to the heater 18 when either the on period is greater than the off period or the off period is greater than the on period.

Now if the power on intervals are longer than the power off intervals, there will be a net clockwise rotation of the motor shaft 80. Eventually, the actuating arm 78 attached to the motor shaft 80 will make contact with pin 74 on the disk 72 attached to the shaft 70 of the variable voltage transformer 16 and will rotate the shaft 70 in a clockwise direction causing the voltage supplied to the heater 18 to be increased. During the power off cycles, the actuating arm 78 will rotate counterclockwise away from pin 74. However, since the power off period is less than the power on period, the pin 76 will not be contacted by arm 78. As long as the on intervals are longer than the off intervals, the shaft 70 of the variable voltage transformer 16 will receive a certain amount of clockwise rotation during each on-off cycle. Eventually, the power level supplied to the heater 18 will produce equal on-off intervals and there will be no further rotation of the shaft 70 of the variable voltage transformer 16.

Now if the power on interval is shorter than the power off interval, a net counterclockwise rotation of the motor actuating arm 78 will occur so the actuating arm 78 is in contact with the pin 76. Further, on-off cycles will cause the shaft of the variable voltage transformer 16 to be rotated in a counterclockwise direction, reducing the power level supplied to the heater 18. Eventually, equal on-off time intervals will be achieved again and further rotation of the variable voltage transformer shaft 70 will cease.

Electrical limit switches 56 and 58 are provided in lines 40 and 42, respectively, to deenergize the motor 24 whenever the shaft 70 of the variable voltage transformer 16 has been rotated to its maximum clockwise or counterclockwise position. The response speed of this adjusting system can be varied by changing the motor shaft speed and/or by varying the angular spacing between pin 74 and pin 76 thereby altering the cycle time interval error integrating capacity.

It is to be understood that various modifications can be made to this system without varying from the scope of the appended claims. For example, if a direct current source is substituted for the alternating current voltage source 10 of the figure, a potentiometer or variable resistance may be substituted for the transformer 16.

I claim:

1. An automatic temperature controlling system comprising: a voltage source; a heater located within an enclosure, the temperature of which is being controlled; means including a movable voltage tap for supplying voltage to said heater; means connected to the voltage tap including spaced-apart actuating arm contact members spaced a predetermined distance; an actuating arm located between said contact members; a thermoelement within said enclosure; and means interconnecting the thermoelement and the actuating arm including an on-off controller whereby when the temperature within the enclosure varies from a predetermined temperature, the heater will be turned on and off and as long as the on-off time periods are unequal, a net movement of the actuating arm will move the voltage tap in the appropriate direction until the on-off time periods are equalized.

2. An automatic temperature controlling system in accordance with claim 1 wherein the means connected to the voltage tap including spaced-apart actuating arm contact members is a shaft having a disk mounted thereon with the contact members arcuately spaced on the disk, and the means interconnecting the thermoelement and the actuating arm also includes a reversible electric motor having a shaft to which the actuating arm is connected.

3. An automatic temperature controlling system in accordance with claim 2 wherein the means including a movable voltage tap for supplying voltage to said heater is a variable voltage transformer and the voltage source is an alternating current voltage source.

4. An automatic temperature controlling system comprising: an alternating current voltage source; an auto-transformer connected across the voltage source; a heater located within an enclosure, the temperature of which is being controlled, said heater being connected across one terminal of the voltage source and a voltage tap to the auto-transformer; a shaft connected to the voltage tap; a disk connected to the end of the shaft; a pair of pins on the disk arcuately spaced a predetermined distance apart; an on-off controller also connected across the voltage source and between the voltage source and the auto-transformer; a normally open switch in the line leading from the voltage source to the auto-transformer; a two-phase reversible motor also connected across the voltage source; a shaft extending from the motor; an actuating arm connected to the end of the shaft and extending along the face of the disk; a conducting line for causing rotation of the actuating arm in one direction; a second conducting line for causing rotation of the actuating arm in the other direction; a normally closed switch in one of said lines; a normally open switch in the other of said lines; a thermoelement within said enclosure; electricity conducting lines leading from the thermoelement to the on-off controller; and means controlled by the on-off controller responsive to current from the thermoelement to reverse the positions of all of said three aforementioned switches whereby when the temperature within the enclosure varies from the predetermined temperature to below the predetermined temperature, the heater will be turned on and off and as long as the on-off time periods are unequal, a net rotation of the actuating arm will rotate the disk to move the tap of the auto-transformer in the appropriate direction until the on-off time periods are equalized.

References Cited in the file of this patent

UNITED STATES PATENTS

| 2,009,013 | Karplus et al. | July 23, 1935 |
| 2,149,729 | Finch | Mar. 7, 1939 |
| 2,249,844 | Martin | July 22, 1941 |
| 2,594,984 | Penther et al. | Apr. 29, 1952 |

FOREIGN PATENTS

| 908,971 | France | Nov. 12, 1945 |